United States Patent [19]

Atsumi et al.

[11] Patent Number: 5,589,678

[45] Date of Patent: Dec. 31, 1996

[54] SCANNER OF A BAR CODE VERIFIER

[75] Inventors: Toru Atsumi; Yasuhiro Kamijo, both of Kariya; Yoshiki Furukawa; Naoki Matumura, both of Hadano, all of Japan

[73] Assignees: Nippon Denso Co. Ltd.; Stanley Electric Co. Ltd., both of Aichi-ken, Japan

[21] Appl. No.: 531,469

[22] Filed: Sep. 21, 1995

[30] Foreign Application Priority Data

Sep. 22, 1994 [JP] Japan .................................. 6-254630

[51] Int. Cl.$^6$ ...................................................... G06K 7/10
[52] U.S. Cl. ............................................ 235/472; 235/467
[58] Field of Search ....................................... 235/467, 472

[56] References Cited

U.S. PATENT DOCUMENTS 4,818,856  4/1989  Matsushima ............................ 235/472

FOREIGN PATENT DOCUMENTS 61-244168  10/1986  Japan .
5-120462   5/1993   Japan .
6-38530    10/1994  Japan .

*Primary Examiner*—Harold Pitts
*Attorney, Agent, or Firm*—Louis Weinstein

[57]  ABSTRACT

A scanner of a bar code verifier is provided with a viewing window that allows the operator to align the scanner and a bar code to be scanned by the scanner. However, such a viewing window also allows external light to enter the scanner and reduce the accuracy with which the bar code is verified. This problem is solved by a scanner 1 of a bar code verifier according to the invention provided with a blind shutter 8 that can selectively open or close the viewing window 7 so that, during the operation of reading and verifying the bar code, the viewing window 7 may be closed by the blind shutter 8 to improve the accuracy with which the bar code is verified.

9 Claims, 3 Drawing Sheets

SCANNER OF A BAR CODE VERIFIER

BACKGROUND OF THE INVENTION

1. Field of the Invention

This invention relates to a bar code verifier designed to check if a bar code disposed on a package or some other object typically by printing meets the requirements of a given standard and, more particularly, it relates to a scanner of such a machine for reading the bar code.

2. Background Art

Japanese patent Laid-Open publication No. 5-120462 discloses a scanner for reading a bar code. This known scanner is provided with a viewing window where a dichroic mirror which is arranged so that the operator can ensure that the scanner is properly placed relative to the bar code to be read.

The dichroic mirror may be so designed as to reflect only rays of red light emitted from a red-light emitting device (red-LED) housed within the scanner and allows rays of light having a wavelength shorter than that of red light to pass therethrough. Consequently any external rays of light having a wavelength close to that of red light emitted from the light source (LED) are reflected by the outer surface of the dichroic mirror and not allowed to enter the scanner whereas rays of light having a relatively short wavelength are allowed to enter and pass through the dichroic mirror and reflected by the bar code to pass through the dichroic mirror again before they get to the operator so that the operator can easily view the bar code if the scanner is properly located relative to the bar code.

On the other hand, a sensor device is arranged within the scanner at a position appropriate for receiving the rays of light reflected by the dichroic mirror and, therefore, the rays of light that have a relatively short wavelength and hence enter the scanner from outside would not get to the sensor device. Consequently, the scanner can read the bar code without being adversely affected by external light.

However, the above described conventional scanner functions properly only when the dichroic mirror operates to show an ideal transmissivity curve (a) as illustrated in FIG. 5.

On the other hand, the line (b) illustrated in FIG. 5 represents a normally observably transmissivity curve of a scanner. Therefore, rays of light having a wavelength within the range A are allowed to pass through the dichroic mirror and reflected by the plane of the bar code, say by 50%, before they reenter the dichroic mirror and are received by the sensor device.

Thus, the known scanner is influenced by external light to consequently degrade the contrast of the image to be picked up by the sensor device to a significant extent.

Japanese patent Laid-Open publication No.5-120462 discloses a scanner using a half mirror in place of a dichroic mirror, although it is obvious that such a scanner is also adversely affected by external light.

While such a degradation in contrast due to the presence of a viewing window may not be significant if a scanner of the type under consideration is used for reading bar codes in a retail shop, it provides a problem of impermissible inaccuracy if the scanner is used for the purpose of verifying bar codes. On the other hand, a viewing window is indispensable for a scanner in order for the latter to be accurately placed relative to a bar code. Therefore, one object of the present invention is to provide a scanner having a viewing window that is free from the above problem.

SUMMARY OF THE INVENTION

According to the invention, the above object is achieved by providing a scanner of a bar code verifier comprising a viewing window for aligning the scanner and the bar code characterized in that the viewing window is provided with a blind shutter for opening and closing the viewing window.

DETAILED DESCRIPTION OF THE PREFERRED EMBODIMENTS

Figure 1:
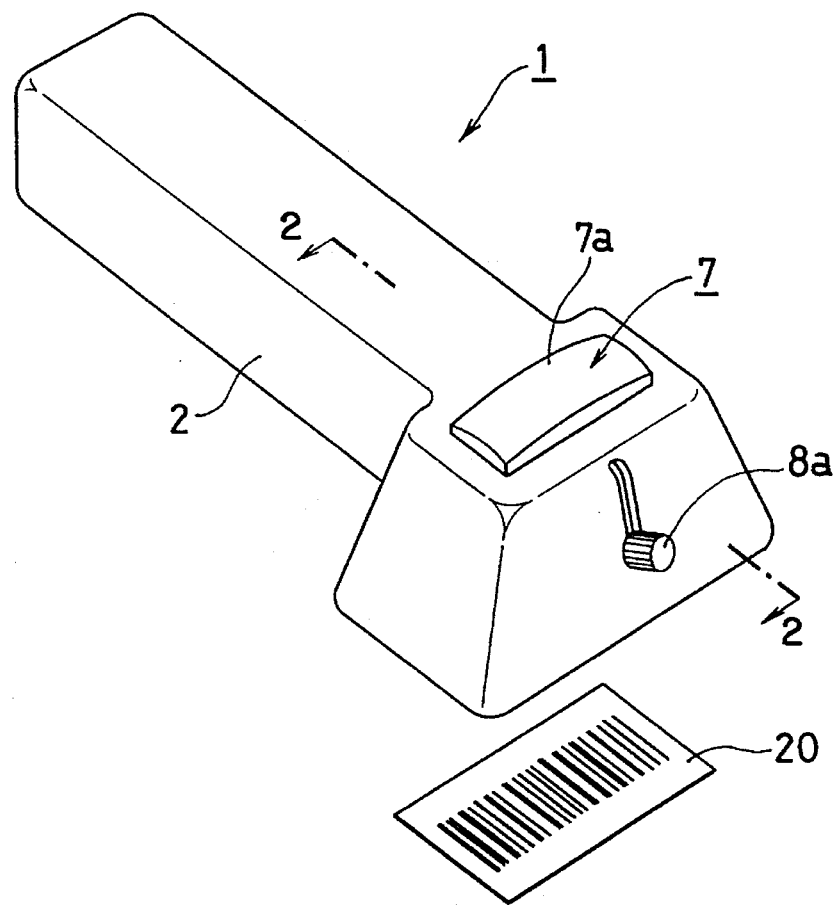
FIG. 1 is a schematic perspective view of an embodiment of scanner of a bar code verifier according to the present invention.
Figure 2:
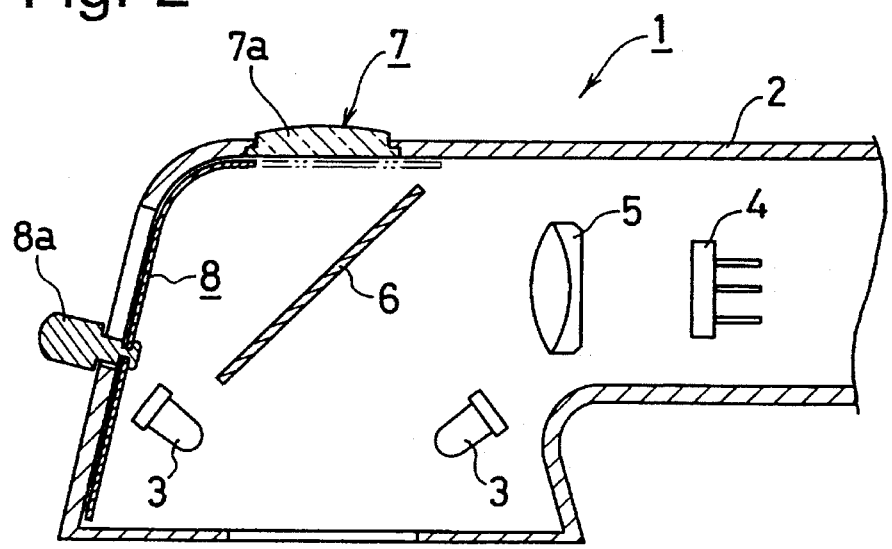
FIG. 2 is a cross sectional view of the embodiment of FIG. 1 taken along line 2—2.

Now, the present invention will be described in greater detail by referring to the accompanying drawings that illustrate preferred embodiments of the invention. FIGS. 1 and 2 show a first embodiment of scanner of a bar code verifier (hereinafter simply referred as scanner) according to the invention. Like a prior art scanner, the scanner 1 of FIGS. 1 and 2 comprises a case 2 provided with a viewing window 7, light sources 3, 3, which is typically an LED for illuminating a bar code 20 and contained in the case 2, a sensor device 4 which is typically a CCD and a lens 5 for forming an image of the bar code 20 on the sensor device 4.

Also like a prior art scanner, a reflection plane 6 is produced by a half mirror or a dichroic mirror somewhere on the light path between the bar code 20 and the sensor device 4 so that the operator can view the bar code 20 through the reflection plane 6 and the viewing window 7 to ensure the positional relationship between the scanner 1 and the bar code 20. Note that,in this embodiment, the viewing window 7 has a window pane 7a and the operator sees the back of the reflection plane 6 through the window pane 7a.

With the above described arrangement, rays of external light enter the scanner through the viewing window 7 and are irregularly reflected before they impinge upon the sensor device 4 to degrade the contrast of the image to be detected by the sensor. However, this problem is avoided by a blind shutter 8 specifically arranged for closing and opening the viewing window 7.

The blind shutter 8 is flexible and typically made of an opaque resin film or a thin metal plate so that it may be moved along the curved inner surface of the case 2 to open or close the viewing window 7 and, therefore, the scanner 1 need not be significantly enlarged in order to accommodate the blind shutter 8.

For verifying a bar code 20 with the scanner 1, the operator moves the blind shutter 8 to its open position to expose the viewing window 7 and places the scanner 1 vis-a-vis the bar code 20. If the reflection plane 6 is that of a half mirror, the bar code 20, the latter can be seen through the viewing window 7 and, therefore, aligned easily with the scanner 1 as it is illuminated by the light source 3. Then, the operator moves the blind shutter 8 to its closed position to cover the viewing window 7 and causes the scanner to read and verify the bar code 20 so that there may be no degradation of contrast by external light of the detected image of the bar code 20.

If, on the other hand, the reflection plane 6 is that of a dichroic mirror which is designed to reflect rays of light coming from the light source 3 with a particular wavelength, the operator cannot see the bar code 20 when the viewing window 7 is open because all the rays of light coming from the light source 3 to irradiate the bar code 20 are reflected by the mirror.

In such a case, the light source 3 may be replaced by one that emits light with a wide range of wavelength such as an incandescent lamp so that the operator can see the bar code 20 with the components of light other than the one having the wavelength reflected by the dichroic mirror and received by the sensor device 4 or the viewing window 7 may be made wide enough to take in a sufficient amount of external light so that the operator can see the bar code 20 with external light. If external light is used for the operator to, see the bar code 20, the operator simply closes the blind shutter 8 after aligning the scanner 1 and the bar code 20 so that the scanner 1 may accurately read and verify the bar code without being affected by irregular reflection of light.

The scanner 1 operates differently when the reflection plane 6 is produced by a half mirror and when it is produced by a dichroic mirror in a manner as described below. When a half mirror is used, the rays of light reflected by the plane of the bar code 20 are transmitted through the half mirror typically by 50% and the remaining 50% of the reflected rays of light are reflected again by the mirror and are directed to the sensor device 4. Thus, the rays of light coming from the light source 3 are utilized by both the sensor device 4 and the operator simultaneously, although the efficiency with which the light is used for verifying the bar code 20 is reduced.

When, on the other hand, a dichroic mirror is used, all the rays of light coming from the light source 3 are reflected by the mirror and move toward the sensor device 4 to remarkably raise the efficiency with which the light is used for verifying the bar code 20, although some light, such as external light, having a wavelength other than that of the rays of light coming from the light source 3 is required to enable the operator to see the bar code 20 through the viewing window. In short, a half mirror and a dichroic mirror provide respective advantages and disadvantages if used in a scanner according to the invention. For the purpose of the invention, therefore, it is necessary to select either one of them depending on the requirements of the specific application of a scanner according to the invention.

Figure 3:
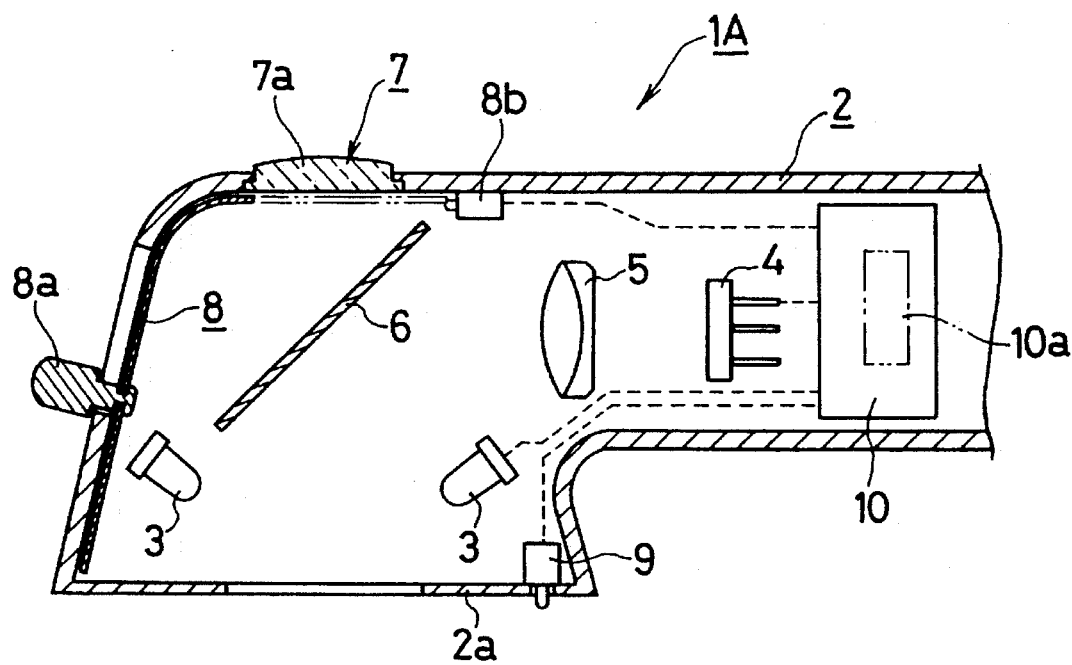
FIG. 3 is a cross sectional view of another embodiment of scanner of a bar code verifier according to the present invention.

FIG. 3 is a cross sectional view of another embodiment of scanner according to the invention. Referring to FIG. 3, the scanner 1A comprises a case 2 provided with light sources 3, 3, a sensor device 4, a lens 5, a reflection plane 6, a viewing window 7 and a blind shutter 8 as in the case of the above described first embodiment. Additionally, the case 2 is provided on the bottom 2a thereof with a contact sensing switch 9 for sensing a state of contact between the scanner 1 and the plane carrying the bar code 20 and a control circuit 10.

With the above arrangement, if the contact sensing switch 9 is turned on to indicate that the scanner 1A is placed directly on the bar code 20, the control circuit 10 immediately turns off the light source 3 for a very short period of time to check and see if the sensor device 4 provides an output. If there is an output of the sensor device 4, it indicates that the viewing window 7 is open, allowing external light to enter the scanner and the control circuit 10a causes a buzzer 10 to sound and notify the operator of the fact that the blind shutter 8 is not completely closed and hence the scanner 1A cannot carry out the operation of reading and verifying the bar code 20.

A limit switch 8b may additionally be provided at the end of the track of the blind shutter 8 on the case 2 that the blind shutter 8 reaches when the viewing window 7 is completely closed in order to cause the buzzer 10a to stop sounding and notify the operator of the fact. Then, the buzzer 10a continues the sounding as long as the operator is trying to align the scanner 1A and the bar code 20 and stops sounding only when the blind shutter 8 is moved to its completely closed position so that a situation where the operator makes the scanner 1A read and verify the bar code 20 without completely closing the viewing window 7 can be prevented positively from taking place.

Thus, with the above described embodiment, the viewing window 7 is completely closed whenever the operation of verifying a bar code is conducted and the operator starts a verifying operation only after the blind shutter 8 is moved to its completely closed position. In other words, a bar code verifying operation is carried out within a period of time that may be varied depending on the skill of the operator and other factors.

Figure 4:
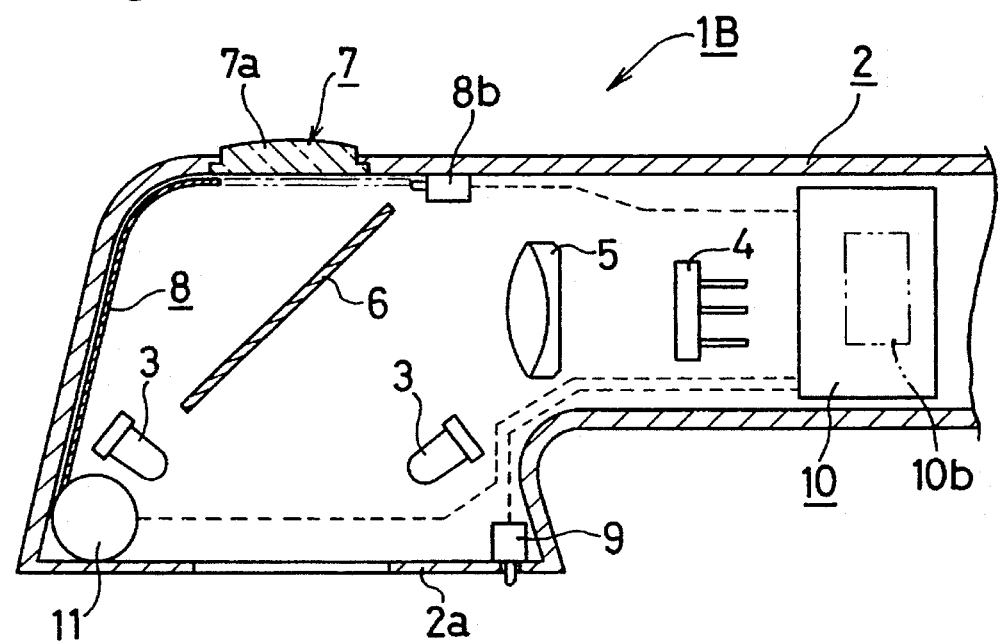
FIG. 4 is a cross sectional view of a still another embodiment of scanner of a bar code verifier according to the present invention.
Figure 5:
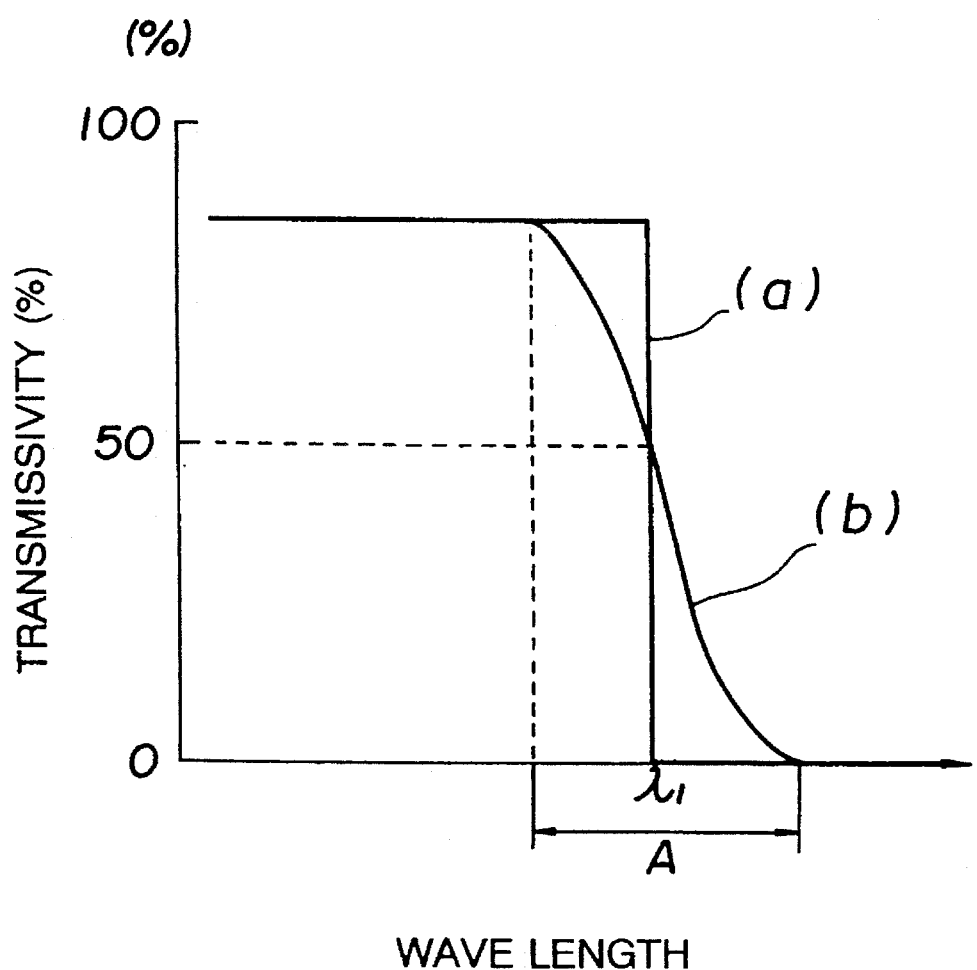
FIG. 5 is a graph illustrating an ideal transmissivity curve of a dichroic mirror.

FIG. 4 shows a cross sectional view of still another embodiment of scanner according to the invention. Referring to FIG. 4, the scanner 1B comprises a case 2 provided with a light source 3, a sensor device 4, a lens 5, a reflection plane 6, a viewing window 7, a blind shutter 8, a limit switch 8b, a contact sensing switch 9 and a control circuit 10 as in the case of the preceding embodiment as well as a blind shutter shifting mechanism 11 for positionally shifting the blind shutter 8 between a closed position and an open position, the control circuit 10 being additionally provided with a timer 10b.

With the scanner 1B configured in a manner as described above, as the contact sensing switch 9 is turned on to notify that the scanner 1B is placed on a bar code 20, the control circuit 10 starts the internal timer 10b and, when the time set in the timer 10b expires, drives the shifting mechanism 11 to move the blind shutter 8 to its closed position and turns on the limit switch 8b to cause the scanner 1B to automatically start a bar code reading and verifying operation or be put to a ready state for an operation.

When the operation is over and the scanner 1B is moved away from the bar code 20, the control circuit drives the shifting mechanism 11 to move the blind shutter 8 to its open position and brings the scanner into a stand-by state for a subsequent operation. The timer 10b may be set such that a sufficient period of time is allowed to any operator to carry out an operation of aligning the scanner 1B and the bar code 20. Thus, while the time allotted to a single verifying operation is made invariable with this embodiment, the entire verifying operation can be advantageously simplified particularly when a large number of bar codes are involved in the operation.

While a contact sensing switch is used in the above embodiment, a pressure sensing switch or a light sensing switch may alternatively be used. Still alternatively, the contact sensing switch may be replaced by an arrangement with which the blind shutter is closed and opened or a blind-shutter-open-state is notified by a scanning operation initiating switch or a scanning operation start command (typically issued by a microcomputer connected to the scanner in order to analyze the output wave form of the scanner and control the operation of the scanner).

As described above in detail, the viewing window of a scanner of a bar code verifier according to the invention is provided with a blind shutter that can be closed to shut off external light trying to enter the scanner in order to prevent possible degradation in the accuracy of operation of verifying a bar code that may occur to known scanners of the type under consideration. Thus, a scanner of a bar code verifier that operates highly accurately can be provided by the present invention.

Additionally, a scanner according to the invention may be provided at the bottom thereof with a contact sensing switch, which, upon sensing a contact state between the bottom and a bar code carrying plane placed thereunder, temporarily turns off the light source to check and see if the viewing window is completely closed so that, if the viewing window is not completely closed, the operator is notified of the fact. With such an additional arrangement, any undesirable circumstances involving an inadvertently unclosed blind shutter can be effectively avoided to further improve the efficiency and accuracy of the operation of the bar code verifier.

Finally, a scanner according to the invention may be further provided with an additional arrangement that operates to drive the blind shutter to move and close the viewing window after a predetermined period of time if a contact state is detected between the bottom of the scanner and a bar code carrying plane and immediately drives the blind shutter to move to an open position, if a no contact state is detected between the bottom of the scanner and a bar code carrying plane. With such an arrangement, the entire bar code verifying operation can be advantageously simplified particularly when a large number of bar codes are involved in the operation.

What is claimed is:

1. A scanner for reading a bar code comprising:

a light source for irradiating a bar code with rays of light;

a sensor device for receiving rays of light reflected by said bar code;

a case for housing said light source and said sensor device;

characterized in that said case is provided with an opening for allowing said reflected rays of light to enter the case arranged at a position to be placed vis-a-vis said bar code;

a viewing window for allowing the operator of the scanner to confirm the alignment of said bar code and said opening; and a blind shutter for closing said viewing window, to block external light from entering the scanner.

2. A scanner for reading a bar code according to claim 1, characterized in that said blind shutter is made of a flexible material so that it may be curved and moved to a predetermined position for opening the viewing window.

3. A scanner for reading a bar code according to claim 1 or 2, characterized in that a switch is arranged near the reading opening to detect a properly aligned state of a bar code in the reading opening and, causing turning off the light source and then causing an alarm to be operated if a properly aligned state of the bar code and opening of the viewing window is detected, the closed or open state of the viewing window determined from the output of the sensor device so that, if the viewing window is open when the light source is off, the alarm notifies the operator of an inoperable state of the scanner.

4. A scanner according to claim 1 further comprising:

means responsive to placement of said reading opening adjacent to a surface upon which a bar code is provided for providing a signal; and means responsive to said signal for moving said blind shutter to cover said viewing window.

5. A scanner according to claim 3, further comprising:

switch means responsive to movement of the blind shutter to a position fully covering said viewing window for halting said means for operating said blind shutter.

6. A scanner according to claim 1, further comprising:

switch means responsive to placement of said reading opening adjacent to a surface having a bar code for generating a signal; and means responsive to said signal for moving said blind shutter to a position covering said viewing window a predetermined time interval after receipt of said signal.

7. The scanner of claim 6 wherein said switch means provides a second signal when the reading opening is removed from the surface having a bar code, and means responsive to said second signal for operating said means for driving to move said blind shutter to a position uncovering said viewing window.

8. The scanner of claim 1 wherein reflected light from said bar code is partially reflected towards said sensor and partially transmitted to said viewing window by a dichroic mirror.

9. The scanner of claim 1 wherein reflected light from said bar code is partially reflected towards said sensor and partially transmitted to said viewing window by a half mirror.

* * * * *

UNITED STATES PATENT AND TRADEMARK OFFICE
CERTIFICATE OF CORRECTION

PATENT NO. : 5,589,678
DATED : December 31, 1996
INVENTOR(S) : Atsumi et al

It is certified that error appears in the above-identified patent and that said Letters Patent is hereby corrected as shown below:

Col. 4, line 7, delete "a" after "10".

Col. 4, line 8, insert after "10" insert --a--.

Col. 4, line 21, before "prevented" insert --positively--.

Col. 4, line 22, after "prevented" delete --positively--.

Col. 5, line 48, delete "an" and insert instead --a reading--.

Col. 5, line 51, delete "the" and insert instead --an--.

Col. 5, line 52, delete "the".

Col. 6, line 1, after "for" insert --selectively--.

Signed and Sealed this

Twenty-first Day of September, 1999

Attest:

Q. TODD DICKINSON

*Attesting Officer*            *Acting Commissioner of Patents and Trademarks*